United States Patent
Wang et al.

(10) Patent No.: US 8,307,507 B2
(45) Date of Patent: Nov. 13, 2012

(54) HINGE ASSEMBLY

(75) Inventors: Jin-Xin Wang, Shenzhen (CN); Jian Li, Shenzhen (CN); Liang Wei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 497 days.

(21) Appl. No.: 12/534,258

(22) Filed: Aug. 3, 2009

(65) Prior Publication Data

US 2010/0319163 A1 Dec. 23, 2010

(30) Foreign Application Priority Data

Jun. 22, 2009 (CN) .......................... 2009 1 0303508

(51) Int. Cl.
 *E05D 11/10* (2006.01)
(52) U.S. Cl. ................. 16/334; 16/337; 16/344
(58) Field of Classification Search ............. 16/319, 16/334, 321, 322, 332, 333, 337–341, 344, 16/347, 374, 376, 377, 303
See application file for complete search history.

(56) References Cited

U.S. PATENT DOCUMENTS

| | | | | |
|---|---|---|---|---|
| 7,520,025 | B2* | 4/2009 | Hung | 16/337 |
| 2003/0097732 | A1* | 5/2003 | Kim | 16/337 |
| 2003/0122046 | A1* | 7/2003 | Huong | 248/291.1 |
| 2007/0136995 | A1* | 6/2007 | Hu et al. | 16/340 |

* cited by examiner

*Primary Examiner* — Jeffrey O Brien
(74) *Attorney, Agent, or Firm* — Altis Law Group, Inc.

(57) ABSTRACT

A hinge assembly includes a shaft, a first bracket, a second bracket, a spacer, and a restricting member. The spacer includes a main body and a resilient area protruding from the main body. The resilient area includes a top portion and a base portion connecting the top portion with the main body. The restricting member and the second bracket are arranged at opposite sides of the spacer. The restricting member forms a protrusion resisting the top portion of the resilient area. The spacer is fixed with the second bracket, and the second bracket includes a receiving portion corresponding to the resilient area. The base portion is located in the projection of the receiving portion projected at the spacer, situated parallel to the axis of the shaft.

15 Claims, 4 Drawing Sheets

HINGE ASSEMBLY

BACKGROUND

1. Technical Field

The present disclosure generally relates to hinge assemblies, and particularly, to a hinge assembly used in an electronic device.

2. Description of Related Art

A collapsible electronic device such as a notebook computer generally has a main body and a cover with a display pivotally mounted on the main body via a typical hinge assembly.

A typical hinge assembly includes a shaft, an elastic member, a spacer, a fixing bracket, and a rotating bracket. The elastic member, the spacer, the fixing bracket, and the rotating bracket all sleeve on the shaft. An elastic protrusion is formed on the spacer, and a slot opposite to the elastic protrusion is defined in the rotating bracket. The rotating bracket can be positioned by the elastic protrusion engaging in the slot. When the elastic protrusion withdraws from the slot, the elastic member is compressed, and the elastic force created by the elastic member forces the spacer to resist the fixing bracket. Considerable friction is generated between the spacer and the fixing bracket, and stress is easily concentrated at the resisting section. Thus, the fixing bracket and spacer are easily abraded, and the hinge assembly lifespan shortened accordingly.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
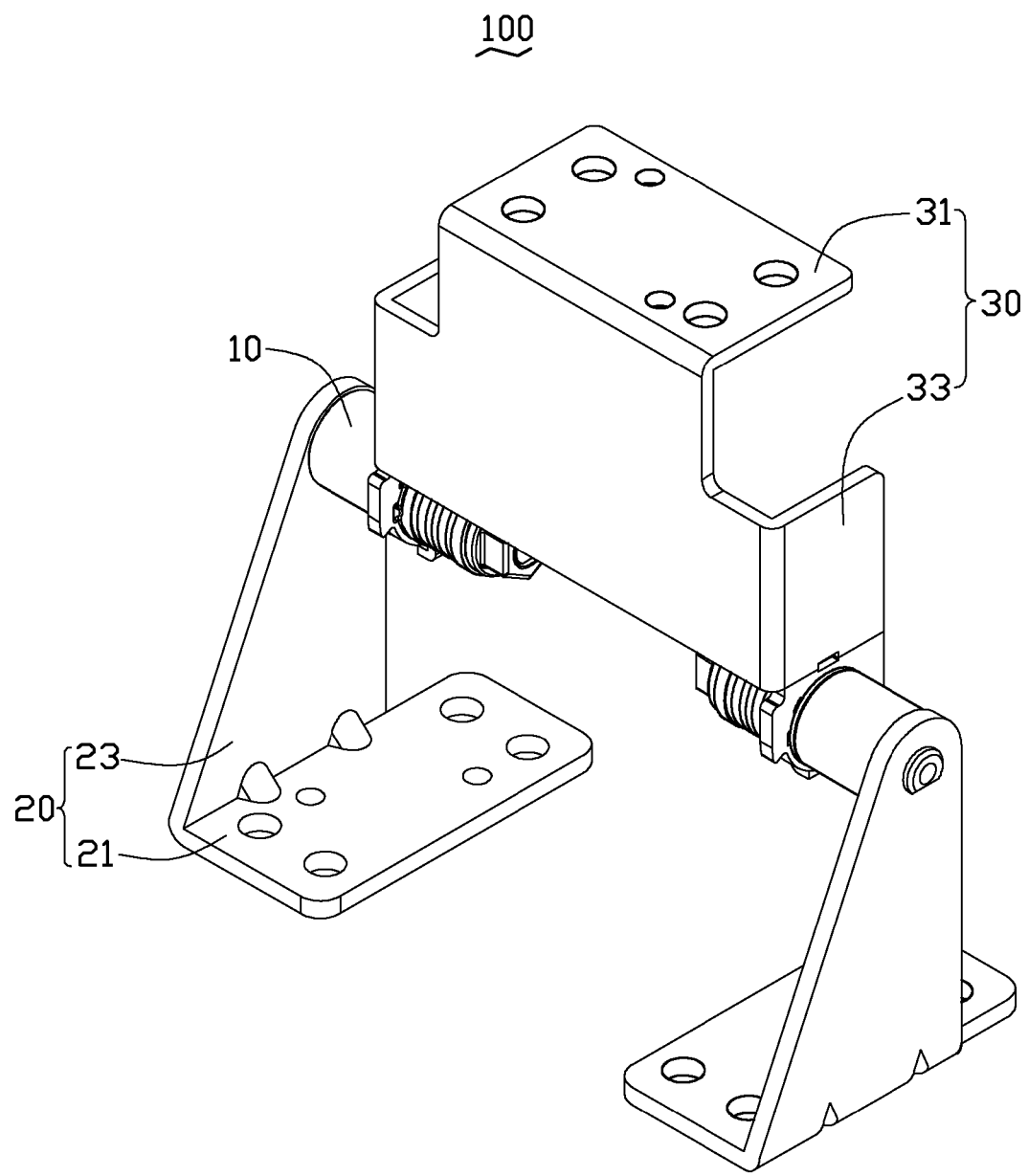
FIG. 1 is an assembled, isometric view of a first embodiment of a hinge assembly, the hinge assembly including a restricting member, a spacer, and a connecting end.
Figure 2:
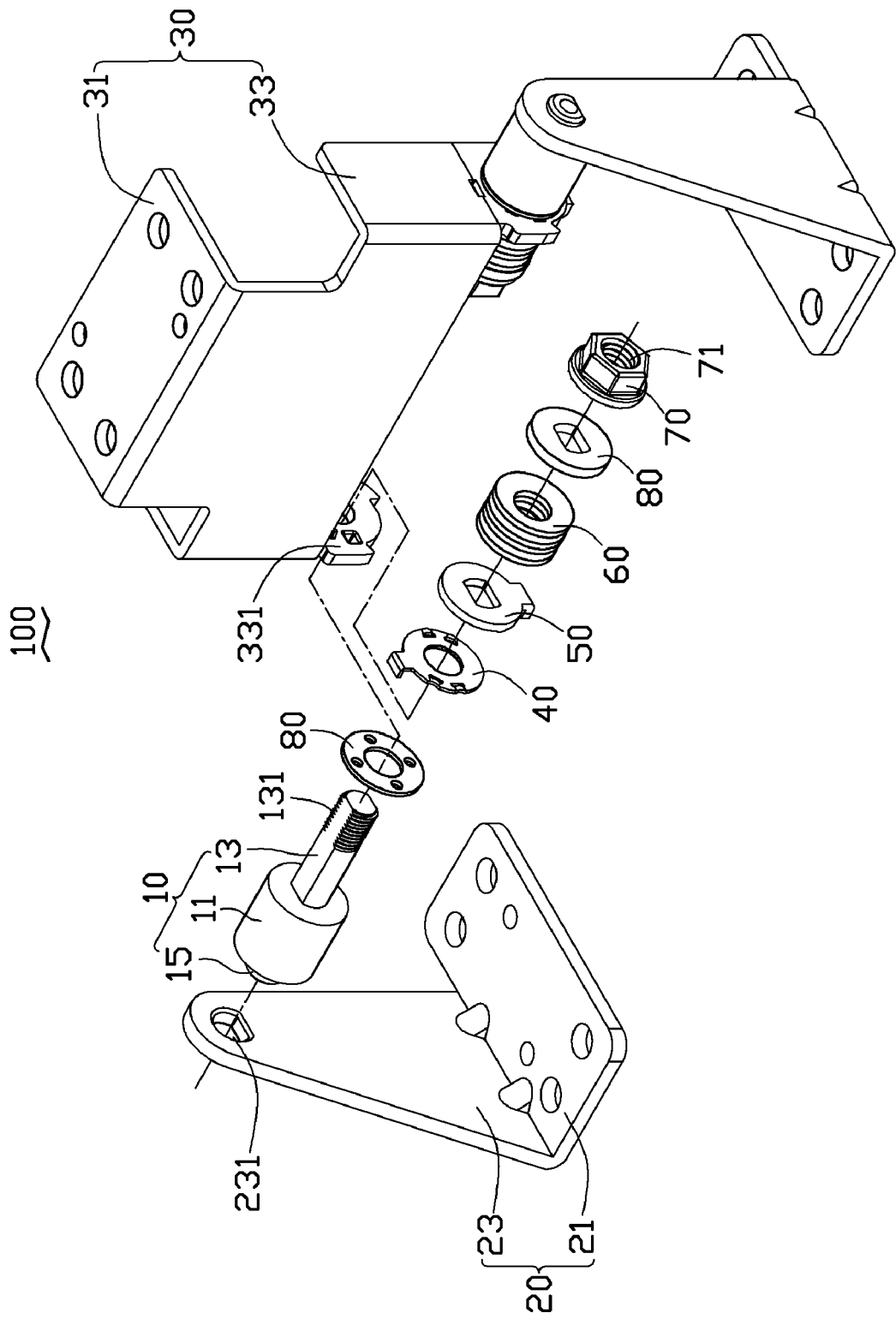
FIG. 2 is an exploded, isometric view of the hinge assembly in FIG. 1.

The hinge assembly as disclosed may be used in a collapsible electronic device, such as printer, portable game console, duplicating machine, or other device capable of utilizing the hinge assembly. Referring to FIG. 1 and FIG. 2, the hinge assembly 100 includes a shaft 10, a first bracket 20, a second bracket 30, a spacer 40, a restricting member 50, a resilient member 60, and a fastener 70. The first bracket 20, the second bracket 30, the spacer 40, the restricting member 50, the resilient member 60 and the fastener 70 all sleeve on the shaft 10. The second bracket 30 and the restricting member 50 are arranged on opposite sides of the spacer 40.

The shaft 10 includes a flange 11, a shaft portion 13 and a connecting portion 15 extending from opposite end surfaces of the flange 11. The shaft portion 13 and the connecting portion 15 both have non-circular cross-sections. A threaded portion 131 is formed on a distal end of the shaft portion 13 away from the flange 11. In the illustrated embodiment, there are two shafts 10.

The first bracket 20 includes a fixing plate 21 and a connecting plate 23 connected to the fixing plate 21. The fixing plate 21 connects the first bracket 20 to the electronic device (not shown). The connecting plate 23 defines a connecting hole 231 to receive the connecting portion 15 of the shaft 10. The connecting hole 231 is non-circular, such that the first bracket 20 non-rotatably connects with the shaft 10. In the illustrated embodiment, there are two first brackets 20 on opposite sides of the second bracket 30.

Figure 3:
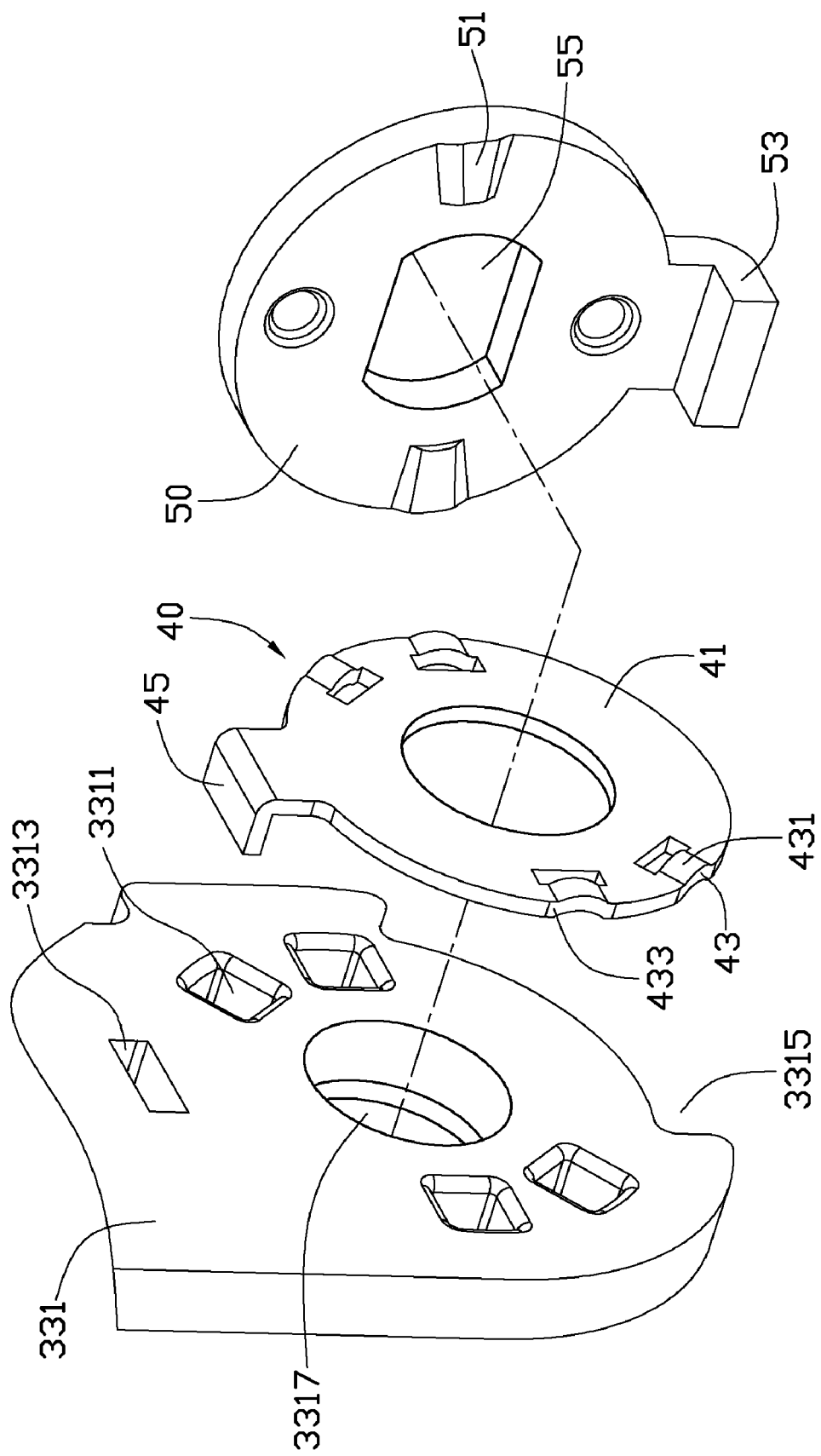
FIG. 3 is an exploded, isometric view of the restricting member, the spacer and the connecting end of FIG. 2.

Referring to FIG. 2 and FIG. 3, the second bracket 30 includes a mounting sheet 31 and a connecting sheet 33. The mounting sheet 31 connects the second bracket 30 to the electronic device. The connecting sheet 33 includes a connecting end 331. The connecting end 331 defines a receiving portion 3311, a fixing hole 3313, a restricting slot 3315, and a shaft hole 3317. In the illustrated embodiment, the receiving portion 3311 is a slot, and four receiving portions 3311 are arranged around the shaft hole 3317. The restricting slot 3315 is defined at the edge of the connecting end 331. The shaft hole 3317 is circular, such that the second bracket 30 rotatably connects with the shaft 10. Two connecting sheets 33 are arranged on opposite sides of the fixing sheet 31 to connect to the two first brackets 20.

The spacer 40 includes a main body 41, a resilient area 43 protruding from the main body 41, and a fixing portion 45 extending from an edge of the main body 41 and bent away from the main body 41. The resilient area 43 includes a top portion 431 protruding from the main body 41 and two base portions 433 connecting the top portion 431 to the main body 41. Adjacent to the top portion 431 is a slot (not labeled). The base portion 433 is a bent region between the top portion 431 and the main body 41. The two base portions 433 are formed at opposite sides of the top portion 431, and connect with the main body 41. In the illustrated embodiment, four resilient areas 43 are positioned opposite to the four receiving portions 3311. The distance between two base portions 433 of each resilient area 43 is shorter than a width of the receiving portion 3311, such that the base portions 433 are located in a gap between the resilient area 43 and the second bracket 30 facing towards the spacer 40, substantially parallel to the axis of the shaft 10, preventing the resilient area 43 from rigidly contacting the second bracket 30.

The restricting member 50 includes two protrusions 51 protruding from one side of the restricting member 50, a restricting portion 53 bent from the edge of the restricting member 50 and a shaft hole 55. The restricting portion 53 engages with the restricting slot 3315 to restrict the rotary angle of the second bracket 30. The shaft hole 55 is non-circular, such that the restricting member 50 non-rotatably connects with the shaft 10.

The resilient member 60 is elastic and sleeves on the shaft portion 13 of the shaft 10. Four resilient members 60 are illustrated.

The fastener 70 defines a fastening hole 71 engaging with the threaded portion 131 of the shaft 10.

In addition, the hinge assembly 100 may further include a friction member 80 sleeved on the shaft portion 13 of the shaft 10.

During assembly of the hinge assembly 100, the shaft 10 is fixed to one first bracket 20. The shaft portion 13 of the shaft 10 extends through a friction member 80, one connecting sheet 33 of the second bracket 30, the spacer 40, the restricting member 50, the resilient member 60, and another friction member 80. The fixing portion 45 of the spacer 40 is received in the fixing hole 3313 of the second bracket 30, and the fastener 70 engages the threaded portion 131 of the shaft 10, such that the members sleeved on the shaft portion 13 are positioned as desired. The same process is used to assemble the other shaft 10, so that the other first bracket 20 is connected with the other connecting sheet 33 of the second bracket 30.

When using the hinge assembly 100, the first bracket 20 is rotated along with the shaft 10 and the restricting member 50. Force created by the protrusion 51 of the restricting member 50 resisting the top portion 431 of the resilient area 43 compresses the resilient area 43. The friction between the members sleeved on the shaft 10 increases by the elastic force created by the resilient area 43, such that the first bracket 20 can remain in any position. In addition, the hinge assembly 100 can self-lock when the protrusion 51 slides from one base portion 433 to the other base portion 433 via the top portion 431.

When the resilient area 43 is compressed, the base portion 433 receives considerable force. The receiving portion 3311 can prevent the base portion 433 from contacting the second bracket 30 directly, such that no force is applied between the base portion 433 and the second bracket 30. Stress is prevented from concentrating in the base portion 433, so that the spacer 40 and the hinge assembly 100 both have improved service life.

In an alternative embodiment, the receiving portion 3311 may be a through hole, and the base portions 433 located in the projection of the outline of the receiving portion 3311 projected at the spacer 40, situated parallel to the axis of the shaft 10.

Figure 4:
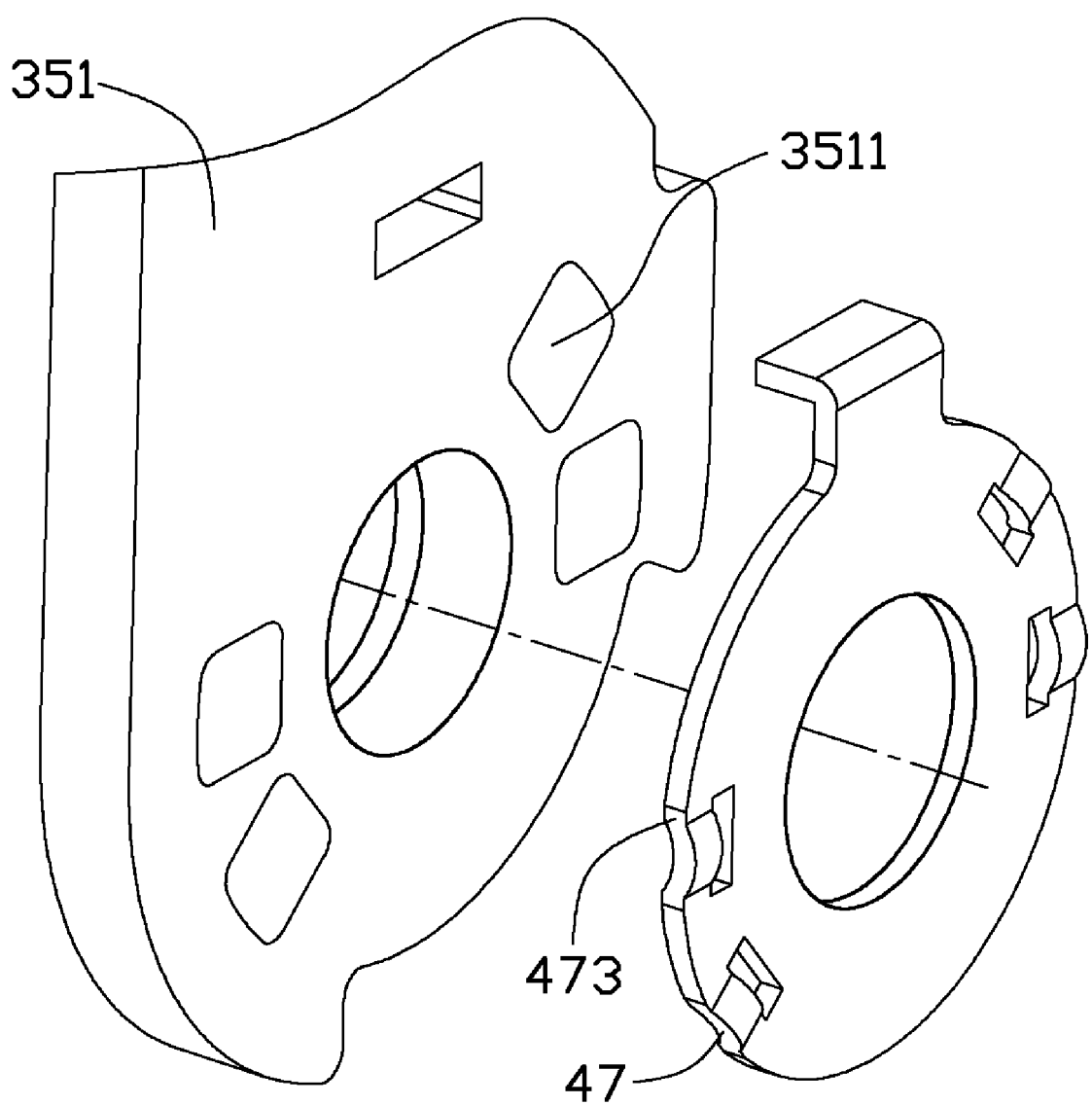
FIG. 4 shows a spacer and connecting end of a second embodiment of a hinge assembly.

Referring to FIG. 4, in an alternative embodiment of the hinge assembly (not labeled), the receiving portion 3511 of the connecting end 351 may be solid, and made of a flexible material which can absorb the force of the base portion 473 of the resilient area 47, such as a sponge, rubber, or other flexible material.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
a shaft;
a first bracket sleeved on the shaft;
a second bracket sleeved on the shaft and comprising a connecting end and a receiving portion defined in the connecting end;
a spacer sleeved on the shaft and comprising a main body and a resilient area protruding from the main body, wherein the resilient area comprises a top portion and two base portions formed at opposite sides of the top portion thereby connecting the top portion with the main body; and
a restricting member sleeved on the shaft, forming a protrusion resisting the top portion of the resilient area;
wherein a distance between the two base portions of the resilient area is shorter than a width of the receiving portion, such that the base portions are located between the resilient area and the second bracket facing towards the spacer, the receiving portion situated parallel to the axis of the shaft, thereby preventing the resilient area from rigidly contacting the second bracket; the base portion is a bent region between the top portion and the main body, such that the hinge assembly is capable of self-locking when the protrusion slides from one base portion to the other base portion via the top portion.

2. The hinge assembly of claim 1, wherein the receiving portion is a slot defined in the connecting end.

3. The hinge assembly of claim 2, wherein the connecting end further defines a fixing hole; the edge of the spacer forms a fixing portion bent away from the main body and engaging with the fixing hole.

4. The hinge assembly of claim 3, wherein the connecting end further defines a shaft hole; the receiving portion is arranged around the shaft hole.

5. The hinge assembly of claim 4, wherein the shaft comprises a shaft portion, a connecting portion, and a flange inbetween the shaft and the connecting portion; the second bracket sleeves on the shaft portion and the first bracket sleeves on the connecting portion.

6. The hinge assembly of claim 5, wherein the shaft portion comprises a non-circular cross-section and engages with a non-circular hole defined in the restricting member.

7. The hinge assembly of claim 6, wherein a restricting portion bent away from the restricting member is formed on an edge of the restricting member; a restricting slot receiving the restricting portion is defined at an edge of the connecting end.

8. The hinge assembly of claim 5, wherein an end of the shaft portion forms a threaded portion and the hinge assembly further comprises a fastener engaging with the threaded portion.

9. A hinge assembly, comprising:
a shaft;
a first bracket sleeved on the shaft;
a second bracket sleeved on the shaft and comprising a receiving portion;
a spacer sleeved on the shaft and comprising a main body and a resilient area protruding from the main body, wherein the resilient area comprises a top portion and two base portions formed at opposite sides of the top portion thereby connecting the top portion with the main body; and
a restricting member sleeved on the shaft, forming a protrusion resisting the top portion of the resilient area;
wherein the receiving portion is opposite to the resilient area, and a distance between the two base portions of the resilient area is shorter than a width of the receiving portion, thereby preventing the base portion of the resilient area from contacting the second bracket; the base portion is a bent region between the top portion and the main body, such that the hinge assembly is capable of self-locking when the protrusion slides from one base portion to the other base portion via the top portion.

10. The hinge assembly of claim 9, wherein the second bracket comprises a connecting end; the receiving portion is defined in the connecting end.

11. The hinge assembly of claim 9, wherein the shaft comprises a shaft portion, a connecting portion, and a flange inbetween the shaft and the connecting portion; the second bracket sleeves on the shaft portion and the first bracket sleeves on the connecting portion.

12. The hinge assembly of claim 11, wherein the shaft portion comprises a non-circular cross-section and engages with a non-circular hole defined in the restricting member.

13. The hinge assembly of claim 12, wherein an end of the shaft portion forms a threaded portion and the hinge assembly further comprises a fastener engaging the threaded portion.

14. The hinge assembly of claim 10, wherein a restricting portion bent away from the restricting member is formed on an edge of the restricting member; a restricting slot receiving the restricting portion is defined at an edge of the connecting end.

15. The hinge assembly of claim 9, wherein the receiving portion is a slot.

* * * * *